United States Patent
Wood et al.

(10) Patent No.: US 10,732,407 B1
(45) Date of Patent: Aug. 4, 2020

(54) NEAR EYE HEAD UP DISPLAY SYSTEM AND METHOD WITH FIXED COMBINER

(71) Applicants: Robert B. Wood, Beaverton, OR (US); Robert D. Brown, Lake Oswego, OR (US)

(72) Inventors: Robert B. Wood, Beaverton, OR (US); Robert D. Brown, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/152,756

(22) Filed: Jan. 10, 2014

(51) Int. Cl.
 *G02B 27/14* (2006.01)
 *G02B 27/01* (2006.01)

(52) U.S. Cl.
 CPC ..... *G02B 27/0101* (2013.01); *G02B 27/0103* (2013.01); *G02B 27/017* (2013.01)

(58) Field of Classification Search
 CPC .............. G02B 27/017; G02B 27/0172; G02B 27/0174; G02B 2027/0181; G02B 27/0081
 USPC ........... 359/630, 631, 632, 15, 569, 567, 34; 345/7; 349/115
 See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |

(Continued)

FOREIGN PATENT DOCUMENTS

| | | |
|---|---|---|
| CN | 200944140 Y | 9/2007 |
| CN | 101151562 A | 3/2008 |

(Continued)

OTHER PUBLICATIONS

Final Office Action on U.S. Appl. No. 13/250,858 dated Feb. 4, 2015, 18 pages.

(Continued)

*Primary Examiner* — Audrey Y Chang
(74) *Attorney, Agent, or Firm* — Donna P. Suchy

(57) ABSTRACT

A display, such as a fixed head up display, can be configured as a near eye display. Display can be used in the environment of the user. Display includes an image source fixed with the environment and a combiner system. The combiner system is configured to be disposed at a near eye location with respect to the user. The combiner system includes at least one diffraction grating member. The diffraction grating member has an input and for receiving an image from the image source and a combiner end for receiving light from the real world scene. The image received at the input end and the light received from the outside scene are provided to the user.

16 Claims, 5 Drawing Sheets

(56) References Cited

U.S. PATENT DOCUMENTS

| | | |
|---|---|---|
| 4,749,256 A | 6/1988 | Bell et al. |
| 4,775,218 A | 10/1988 | Wood et al. |
| 4,799,765 A | 1/1989 | Ferrer |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A * | 4/1995 | Trissel ............... G02B 5/3016 349/115 |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |

(56) References Cited

U.S. PATENT DOCUMENTS

| | | |
|---|---|---|
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 * | 3/2005 | Schehrer et al. .............. 345/7 |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 * | 8/2008 | Mukawa .............. G02B 6/0033 359/15 |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | Dejong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 * | 2/2010 | Powell .............. G02B 5/09 349/11 |
| 7,660,047 B1 | 2/2010 | Travis et al. |
| 7,672,055 B2 | 3/2010 | Amitai |
| 7,675,684 B1 * | 3/2010 | Weissman .......... G02B 27/0172 359/630 |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 * | 6/2010 | Brown et al. .............. 359/631 |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |

(56) References Cited

U.S. PATENT DOCUMENTS

| | | |
|---|---|---|
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 * | 12/2012 | Mukawa et al. ............. 359/630 |
| 8,351,744 B2 | 1/2013 | Travis et al. |
| 8,354,806 B2 | 1/2013 | Travis et al. |
| 8,355,610 B2 * | 1/2013 | Simmonds ......... G02B 27/0081 345/8 |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,472,120 B2 | 6/2013 | Border et al. |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,913,324 B2 * | 12/2014 | Schrader ............ G02B 27/0172 359/630 |
| 8,938,141 B2 | 1/2015 | Magnusson |
| 8,964,298 B2 | 2/2015 | Haddick et al. |
| 9,244,280 B1 | 1/2016 | Tiana et al. |
| 9,341,846 B2 | 5/2016 | Popovich et al. |
| 9,366,864 B1 | 6/2016 | Brown et al. |
| 9,456,744 B2 | 10/2016 | Popovich et al. |
| 9,523,852 B1 | 12/2016 | Brown et al. |
| 9,632,226 B2 | 4/2017 | Waldern et al. |
| 2002/0021461 A1 | 2/2002 | Ono et al. |
| 2002/0127497 A1 | 9/2002 | Brown et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |

(56) References Cited

U.S. PATENT DOCUMENTS

| | | |
|---|---|---|
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284180 A1 | 11/2010 | Popovich et al. |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0232211 A1 | 9/2011 | Farahi |
| 2011/0235179 A1* | 9/2011 | Simmonds ............... 359/567 |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0178901 A1 | 6/2016 | Ishikawa |
| 2016/0209657 A1 | 7/2016 | Popovich et al. |
| 2016/0238772 A1 | 8/2016 | Waldern et al. |
| 2016/0274356 A1 | 9/2016 | Mason |
| 2016/0291328 A1 | 10/2016 | Popovich et al. |
| 2017/0031160 A1 | 2/2017 | Popovich et al. |
| 2018/0052277 A1 | 2/2018 | Schowengerdt et al. |

FOREIGN PATENT DOCUMENTS

| | | |
|---|---|---|
| CN | 101263412 A | 9/2008 |
| CN | 101589326 | 11/2009 |
| CN | 101688977 A | 3/2010 |
| CN | 101726857 A | 6/2010 |
| CN | 101881936 A | 11/2010 |
| CN | 101910900 A | 12/2010 |
| CN | 102608762 A | 7/2012 |
| CN | 104520751 A | 4/2015 |
| DE | 102006 03 785 | 7/2007 |
| EP | 0 822 441 | 2/1998 |
| EP | 2 110 701 | 10/2009 |
| EP | 2 196 729 | 6/2010 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2002-529790 A | 9/2002 |
| JP | 2004-157245 | 6/2004 |
| JP | 2006-350129 A | 12/2006 |
| JP | 2007-011057 A | 1/2007 |
| JP | 2007-219106 A | 8/2007 |
| JP | 2009-133999 A | 6/2009 |
| JP | 2016-030503 | 3/2016 |
| WO | WO-99/52002 | 10/1999 |
| WO | WO-00/28369 A2 | 5/2000 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |
| WO | WO-2016/044193 | 3/2016 |

OTHER PUBLICATIONS

Non-Final Office Action on U.S. Appl. No. 14/038,400 dated Feb. 5, 2015, 18 pages.

Final Office Action on U.S. Appl. No. 13/892,057 dated Mar. 5, 2015, 21 pages.

Office Action for U.S. Appl. No. 13/250,858 dated Feb. 19, 2014, 13 page.

Office Action on U.S. Appl. No. 13/250,940 dated Mar. 25, 2014, 12 pages.

(56) References Cited

OTHER PUBLICATIONS

Office Action on U.S. Appl. No. 13/251,087 dated Mar. 28, 2014, 12 pages.
Amendment and Reply for U.S. Appl. No. 12/571,262, dated Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, Aug. 17, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/892,026 dated Apr. 3, 2015, 17 pages.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456 dated Apr. 1, 2015, XX Pages.
Non-Final Office Action on U.S. Appl. No. 13/869,866 dated May 28, 2014, 16 pages.
Non-Final Office Action on U.S. Appl. No. 14/044,676 dated Apr. 9, 2015, 13 pages.
Non-Final Office Action on U.S. Appl. No. 14/225,062 dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, dated Sep. 28, 2011, 5 pages.
Office Action for U.S. Appl. No. 13/355,360, dated Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Non-Final Office Action on U.S. Appl. No. 13/250,858 dated Jun. 12, 2015, 20 pages.
Non-Final Office Action on U.S. Appl. No. 13/250,858 dated Sep. 15, 2014, 16 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Final Office Action on U.S. Appl. No. 13/250,940 dated Oct. 17, 2014, 15 pages.
Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/864,991 dated Oct. 22, 2014, 16 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Plastic has replaced glass in photochromic lens, www.plastemart.com, 2003, 1 page.
Webster's Third New International Dictionary 433 (1986), 3 pages.
Ayras et al., Exit Pupil Expander with a Large Field of View Based on Diffractive Optics, Journal of the SID, 2009, 6 pages.
Cameron, A., The Application of Holographic Optical Waveguide Technology to Q-Sight Family of Helmet Mounted Displays, Proc. of SPIE, vol. 7326, 7326OH-1, 2009, 11 pages.
Notice of Allowance for U.S. Appl. No. 12/700,557, dated Oct. 22, 2013, 9 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,621, dated May 21, 2013, 10 pages.
Office Action for U.S. Appl. No. 13/250,858 dated Feb. 19, 2014, 13 pages.
Office Action for U.S. Appl. No. 13/250,858, dated Oct. 28, 2013, 9 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Wisely, P.L., Head up and head mounted display performance improvements through advanced techniques in the manipulation of light, Proc. of SPIE vol. 7327, 732706-1, 2009, 10 pages.
Final Office Action on U.S. Appl. No. 13/869,866 dated Oct. 3, 2014, 17 pages.
Final Office Action on U.S. Appl. No. 14/038,400 dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 dated Jul. 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 dated Jul. 14, 2015, 32 pages.
Non-Final Office Action on U.S. Appl. No. 14/168,173 dated Jun. 22, 2015, 14 pages.
Notice of Allowance on U.S. Appl. No. 13/355,360 dated Apr. 10, 2014, 7 pages.
Office Action, USPTO, U.S. Appl. No. 10/696,507, dated Nov. 13, 2008 (CTX-290US), 15 pages.
Non-Final Office Action on U.S. Appl. No. 13/844,456 dated Jan. 15, 2016, 16 pages.
Non-Final Office Action on U.S. Appl. No. 14/044,676, dated Jan. 20, 2016, 21 pages.
Non-Final Office Action on U.S. Appl. No. 13/250,858, dated Mar. 18, 2016, 20 pages.
Notice of Allowance on U.S. Appl. No. 13/432,662, dated Feb. 18, 2016, 10 pages.

(56) References Cited

OTHER PUBLICATIONS

U.S. Appl. No. 14/814,020, dated Jul. 30, 2015, Brown et al.
Extended European Search Report for European Application No. 13765610.4 dated Feb. 16, 2016, 6 pages.
Final Office Action on U.S. Appl. No. 13/250,858, dated Jul. 11, 2016, 21 pages.
Final Office Action on U.S. Appl. No. 14/168,173, dated Nov. 4, 2015, 10 pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 13/892,057, dated May 16, 2016, 23 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Notice of Allowance on U.S. Appl. No. 13/892,026, dated Jul. 18, 2016, 10 pages.
Notice of Allowance on U.S. Appl. No. 14/814,020, dated Aug. 12, 2016, 15 pages.
Non-final Office Action on U.S. Appl. No. 13/250,858, dated Nov. 14, 2016, 18 pages.
Non-Final Office Action on U.S. Appl. No. 15/005,507, dated Nov. 22, 2016, 7 pages.
Chinese Office Action issued in corresponding application No. 201310557623, dated Jan. 17, 2017, 13 pages.
Final Notice of Reasons for Rejection on Japanese Application No. JP2015-509120, dated Mar. 7, 2017, English Translation, 2 pages.
Final Office Action on U.S. Appl. No. 14/497,280, dated Mar. 10, 2017, 17 pages.
First Office Action on EPO Application No. 13765610.4, dated Apr. 18, 2017, 4 pages.
Non-Final Office Action on U.S. Appl. No. 13/844,456, dated Dec. 29, 2016, 24 pages.
Non-Final Office Action on U.S. Appl. No. 14/044,676, dated Dec. 29, 2016, 26 pages.
Non-Final Office Action on U.S. Appl. No. 14/715,332, dated Mar. 9, 2017, 14 pages.
Notice of Allowance on U.S. Appl. No. 13/250,858, dated Mar. 20, 2017, 8 pages.
Notice of Allowance on U.S. Appl. No. 13/864,991, dated Feb. 2, 2017, 10 pages.
Notice of Allowance on U.S. Appl. No. 13/892,057, dated Nov. 8, 2016, 10 pages.
Notice of Allowance on U.S. Appl. No. 14/168,173, dated Aug. 8, 2016, 8 pages.
Notice of Allowance on U.S. Appl. No. 14/820,237, dated Jan. 23, 2017, 10 pages.
Notice of Reasons for Rejection for Japanese Application No. 2015-509120, dated Nov. 1, 2016, 4 pages.
Chinese First Office Action for Chinese Patent Application No. 201610512319.1 dated Aug. 11, 2017. 16 pages.
Decision of Rejection for Japanese Patent Application No. 2013-231450 dated May 8, 2018. 4 pages.
European Office Action for European Patent Application No. 13192383.1 dated Oct. 16, 2017. 5 pages.
Final Office Action for U.S. Appl. No. 14/044,676 dated Jul. 13, 2017. 31 pages.
Final Office Action for U.S. Appl. No. 13/844,456 dated Jul. 10, 2017. 20 pages.
Final Office Action for U.S. Appl. No. 14/465,763 dated Jun. 28, 2018. 4 pages.
Final Office Action for U.S. Appl. No. 15/136,841 dated Oct. 27, 2017. 15 pages.
Final Office Action on U.S. Appl. No. 14/715,332, dated Aug. 11, 2017, 14 pages.
First Office Action on Japanese Application No. 2013-231450, dated Aug. 8, 2017, 5 pages.

International Search Report and Written Opinion for PCT/US18/12227, dated Mar. 14, 2018. 9 pages.
Non-Final Office Action for U.S. Appl. No. 13/844,456 dated Oct. 6, 2017. 19 pages.
Non-Final Office Action for U.S. Appl. No. 14/497,280 dated Mar. 19, 2018. 19 pages.
Non-Final Office Action for U.S. Appl. No. 14/715,332 dated Dec. 26, 2017. 8 pages.
Non-Final Office Action for U.S. Appl. No. 15/136,841 dated Jul. 13, 2017. 36 pages.
Non-Final Office Action for U.S. Appl. No. 15/136,841 dated Mar. 12, 2018. 12 pages.
Non-Final Office Action for U.S. Appl. No. 15/460,076 dated Jul. 10, 2018. 15 pages.
Non-Final Office Action on U.S. Appl. No. 14/754,368, dated May 8, 2017, 12 pages.
Non-Final Office Action on U.S. Appl. No. 15/178,521, dated Aug. 24, 2017, 34 pages.
Notice of Allowance for U.S. Appl. No. 14/715,332 dated May 14, 2018. 9 pages.
Notice of Allowance for U.S. Appl. No. 15/005,507 dated May 23, 2017. 8 pages.
Notice of Allowance for U.S. Appl. No. 15/178,521 dated Jan. 31, 2018. 9 pages.
Notice of Allowance for U.S. Appl. No. 15/439,597 dated Jun. 15, 2018. 11 pages.
Second Office Action for Chinese Patent Application No. 201310557623.4 dated Dec. 1, 2017. 21 pages.
Second Office Action for Chinese Patent Application No. 201610512319.1 dated May 2, 2018. 9 pages.
Third Office Action for Chinese Patent Application No. 20130557623.4 dated May 22, 2018. 7 pages. (need English translation as of Jun. 13, 2018).
Corrected Notice of Allowance for U.S. Appl. No. 14/715,332 dated Jul. 25, 2018. 2 pages.
Corrected Notice of Allowance for U.S. Appl. No. 15/439,597 dated Oct. 19, 2018. 2 pages.
Final Office Action for U.S. Appl. No. 13/844,456 dated Apr. 19, 2018. 24 pages.
Final Office Action for U.S. Appl. No. 13/844,456 dated Dec. 17, 2018. 20 pages.
Final Office Action for U.S. Appl. No. 14/044,676, dated Jul. 13, 2017. 30 pages.
Final Office Action for U.S. Appl. No. 14/465,763 dated Nov. 16, 2018. 6 pages.
Final Office Action for U.S. Appl. No. 14/497,280 dated Oct. 18, 2018. 20 pages.
Final Office Action for U.S. Appl. No. 15/048,954 dated Jan. 2, 2019. 26 pages.
Final Office Action for U.S. Appl. No. 15/136,841 dated Aug. 31, 2018. 7 pages.
Final Office Action for U.S. Appl. No. 15/460,076 dated Dec. 3, 2018. 13 pages.
Non-Final Office Action for U.S. Appl. No. 13/844,456 dated Aug. 30, 2018. 17 pages.
Non-Final Office Action for U.S. Appl. No. 15/048,954 dated Jul. 26, 2018. 24 pages.
Non-Final Office Action for U.S. Appl. No. 15/429,569 dated Sep. 17, 2018. 9 pages.
Notice of Allowance for U.S. Appl. No. 15/136,841 dated Nov. 9, 2018. 9 pages.
Supplemental Notice of Allowability on U.S. Appl. No. 13/892,026, dated Nov. 1, 2016, 2 pages.
Third Office Action [With English translation] for CN Application No. 2016105123191 dated Nov. 1, 2018. 16 pages.
U.S. Notice of Allowance on U.S. Appl. No. 14/820,237 dated Jan. 23, 2017.
Corrected Notice of Allowance for U.S. Appl. No. 15/136,841 dated Feb. 1, 2019. 2 pages.
Non-Final Office Action for U.S. Appl. No. 13/844,456 dated Apr. 1, 2019.

(56) References Cited

OTHER PUBLICATIONS

Notice of Allowance for U.S. Appl. No. 15/429,569 dated Jan. 22, 2019. 7 pages.

* cited by examiner

NEAR EYE HEAD UP DISPLAY SYSTEM AND METHOD WITH FIXED COMBINER

CROSS REFERENCE FOR RELATED APPLICATIONS

The present application is related to U.S. patent application Ser. No. 13/432,662 filed Mar. 28, 2013 by Brown et al., which is a continuation-in-part of U.S. patent application Ser. Nos. 13/250,994, 13/250,940, 13/250,621 and 13/251,087 all filed Sep. 30, 2011, by Brown et al., and U.S. patent application Ser. No. 14/109,551 filed by Brown, et al. on Dec. 15, 2013 which is a continuation of U.S. Ser. No. 14/700,557 filed by Brown et al. on Feb. 4, 2010, all assigned to the assignee of the present application incorporated herein by reference in their entireties.

BACKGROUND OF THE INVENTION

The present specification relates to displays. More particularly, the present specification relates to a head up display (HUD).

Display systems have been used to provide information to users for various applications. In aircraft applications, displays can provide precision guidance information to a pilot. For example, fixed head up displays (HUDs) include a fixed projector and a fixed combiner that conformally superimpose images from two sources, the outside world and an electronic image source for presentation to the pilot. HUDs are especially useful in aircraft because they allow the pilot to view information related to flight parameters without diverting attention from the view of the outside world through the windshield. Conventional fixed HUDs require optical components that can be heavy, expensive, and take up space in the cockpit. In addition, fixed HUDs are often difficult to fit into cockpit structures that have asymmetric and non-orthogonal shapes.

Wearable displays can be an alternative to fixed HUDs and generally include a visor, glasses or goggles that operate as combiner. Wearable displays are smaller and lighter than fixed HUDs, but are generally only used to show non-conformal information (airspeed, altitude, etc.). Accordingly, such wearable displays have limited usefulness in cockpit environments. Flight path, guidance, horizon, etc. on a conventional wearable display requires low-latency head tracking equipment.

One embodiment of the worn display discussed in U.S. application Ser. No. 14/700,557 provides head worn elements embodied as waveguides that couple light from a collimator fixed to the cockpit and deliver the light to the pilot's eyes without shifting the bore sight position. The embodiment requires no head tracking, and no electrical connectivity between the head worn waveguides and the aircraft. The wearable waveguides can be entirely passive and insensitive to all six degrees of freedom according to certain embodiments. Although embodiments of worn displays in U.S. patent application Ser. No. 14/700,557 provide significant advantages, worn displays have not been fully accepted by the non-military pilot community.

Thus, there is a need for a lower cost, lighter, and smaller fixed HUD. Further, there is a need for a fixed HUD having the size of a worn display and yet does not require connectivity (mechanical and/or electrical) between the combiner and the rest of the display system. Yet further still, there is a need for a fixed HUD where the combiner is located at a near eye position. Further still, there is a need for a display optimized for use in the constrained cockpit area of small aircraft that meets head impact criteria (HIC) requirements and is bright enough for daylight video. Even further still, there is a need for a fixed HUD that utilizes periscopic principles in the combiner. Yet further, there is a need for a near eye display that does not require head tracking and yet provides precision guidance information conformally aligned with the real world scene.

Accordingly, it would be desirable to provide a display system and/or method that provides one or more of these or other advantageous features. Other features or advantages will be made apparent in the present specification. The teachings disclosed extend to those embodiments which fall within the scope of the appended claims, regardless of whether they accomplish one or more of the aforementioned advantages or features.

SUMMARY OF THE INVENTION

An exemplary embodiment relates to a near eye display for a user in an environment. The environment is distinct from the user. The near eye display includes an image source fixed within the environment and a combiner system. The combiner system is configured to be disposed at a near eye location with respect to the user. The combiner system includes at least one diffraction grating. The combiner system has an input end for receiving an image from the image source and a combiner end for receiving light from a scene. The combiner system provides the image received at the input end and light received from the outside scene to the user.

Another exemplary embodiment relates to a mounted device for use with a display providing a collimated or near collimated image. The mounted device includes a first diffraction grating member configured so that a first end of the first grating diffraction member can be provided in front of eyes of a user and a second end of the first diffraction grating member receives the collimated or near collimated image. The first end receives light from the real world scene. The first diffraction grating member provides horizontal pupil expansion.

Another exemplary embodiment relates to a method of providing guidance information to a pilot's eyes in an aircraft. The method includes using collimated and near collimated light indicative of the guidance information from a display to a passive element disposed within three inches of the pilot's eyes. The passive element is fixed in the environment of the pilot's eyes. The method further includes combining light from a real world scene and the collimated or near collimated light using the passive element. The passive element uses diffractive elements to provide horizontal pupil expansion.

BRIEF DESCRIPTION OF THE DRAWINGS

Exemplary embodiments are hereinafter described with reference to the accompanying drawings, wherein like numerals refer to like elements, and.

DETAILED DESCRIPTION OF THE PREFERRED EMBODIMENTS

Figure 1:
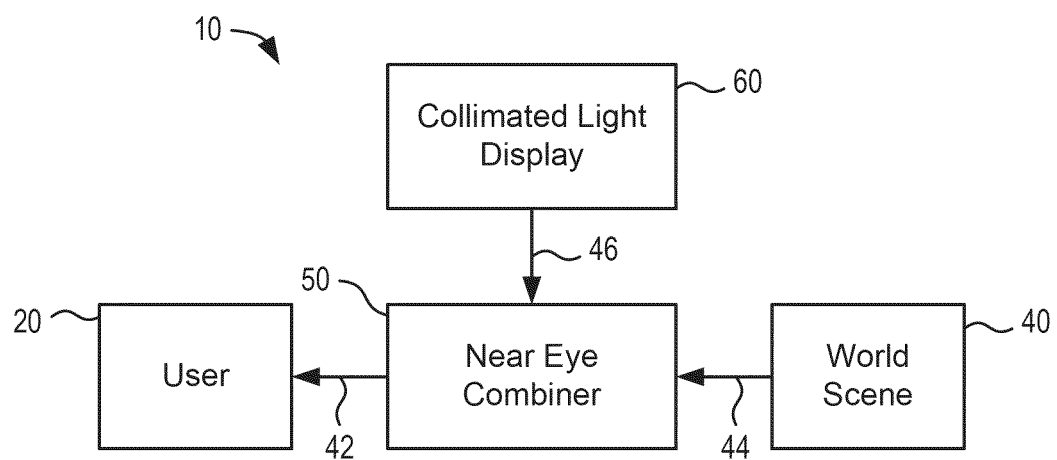
FIG. 1 is a general block diagram of a near eye head up display (HUD) system in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control, and arrangement of components have been illustrated in the drawings by readily understandable block representations and schematic drawings, in order not to obscure the disclosure with structural details which will be readily apparent to those skilled in the art, having the benefit of the description herein. The Figures are not drawn to scale. Further, the invention is not limited to the particular embodiments depicted in the exemplary diagrams and explicitly described herein, but should be construed in accordance with the language in the claims.

With reference to FIG. 1, a near eye display system 10 is configured as a fixed head up display (HUD) according to one embodiment. System 10 is described below for use in a cockpit of aircraft. However, system 10 can be utilized in a variety of applications, including driving applications, military applications, medical applications, targeting applications, etc. without departing from the scope of the invention.

System 10 is a near eye, fixed HUD in one embodiment. The term "near eye" refers to a display where a combiner 50 or other viewing apparatus is disposed in near proximity to eyes of user 20 in one embodiment. Near proximity can include various ranges according to system parameters and design criteria. In one embodiment, near eye solutions are within 4 inches (e.g., within 3 inches, and within 2 inches in certain embodiments) of the eyes of a user 20 when system 10 is in use. In one embodiment, combiner 50 is positioned an inch or two away from the pilot's eyes when in use. In one embodiment, combiner 50 is mounted or attached to a portion of the cockpit environment. A bracket connected to the side of combiner 50 can be attached to a ceiling or side wall of the cockpit in certain embodiments.

System 10 includes combiner 50 and a collimated light display 60. Combiner 50 can have periscopic characteristics and is mounted within an environment of user 20. Combiner 50 is not coupled to or worn by user 20 and does not require head tracking despite being a near eye display according to one embodiment. Combiner 20 is preferably mounted with precision according to a bore sight of an aircraft during installation in one embodiment.

According to one embodiment, system 10 can be configured as an extremely compact near eye HUD system that can fit into most cockpit areas (e.g., pilot or co-pilot) with minimal customization of a mounting fixture. The entire system 10 can be stowed or can breakaway in a fashion to similar current large HUD combiners using hinges or other mechanisms. Alternatively, combiner 50 can stow or breakaway separately from display 60.

According to one configuration, system 10 is small in volume and weight. Collimated light display 60 can be embodied as a Liquid Crystal On Silicon (LCOS) display to provide a very small form factor. Display 60 can include a LCOS image source that can be viewed directly under high magnification without the use of a projection unit that enlarges the display image on a screen according to one embodiment. Elimination of a projection unit that provides an enlarged image to a screen effectively increases illumination by several times and allows low power operation in daylight according to one embodiment.

Embodiments of system 10 can advantageously display information via combiner 50 to both eyes simultaneously from a single optical system, thereby providing full binocular overlap. As a result, the lateral eye box can be quite large for system 10 according to one embodiment. Further, by utilizing a near eye location for combiner 50, a large field of view can be provided with a relatively small combiner glass size according to one embodiment.

In operation, collimated light display 60 provides collimated light or a near collimated light 46 to combiner 50. Combiner 50 combines the near collimated or collimated light 46 with light 44 from a real world scene. In one embodiment, light from the real world scene is received through a windshield. The combined light is provided as light 42 to user 20.

Advantageously, according to one embodiment, system 10 does not require head tracking equipment and electrical connectivity is not required between combiner 50 and collimated light display 60 or other parts of the aircraft. In one embodiment, combiner 50 is entirely passive. Advantageously, combiner 50 is configured so that rays of light 42 exiting combiner 50 are parallel and in a reverse direction to rays of light 46 entering combiner 50 from display 60 according to a periscopic effect in one embodiment. System 10 can be arranged such that rays of light 42 exiting combiner 50 travel in a same direction and are parallel to rays of light 46 in another embodiment.

Various optical components can be utilized to cause to the periscopic effect. For example, the periscope effect can be implemented by waveguides, mirrors, prisms, or other optical components. Combiner 50 can also include additional optic components without departing from the scope of the invention.

Light 46 from collimated light display 60 preferably provides information to user 20. The information can be any type of information useful to user 20. In an aircraft application and according to one exemplary embodiment, the information can be flight parameters, such as, precision guidance information, navigation information, aircraft instrumentation information, or other flight information or warnings used when flying an aircraft. Alternatively, other types of information can be provided by collimated light display system 60 depending upon system criteria and application parameters. For example, display 60 can be used to provide targeting information in military applications or guidance information in surgical applications. Advantageously, the combination of collimated light display 60 and combiner 50 provides a virtual image at optical infinity or near optical infinity of the information associated with light 46 for user 20 similar to an image produced by a conventional fixed head-up display (HUD).

According to a preferred embodiment, combiner 50 is a waveguide that operates both as a guide for collimated light 46 from display 60 and a combiner for combining light 46 with light 44 for viewing by user 20. In one embodiment, combiner 50 utilizes a waveguide with diffraction gratings to achieve the periscopic effect. The waveguide is preferably lighter than more conventional optics such as mirrors, prisms, lenses, etc. Other optical light weight components can be used (e.g., lenses, filters, coatings, etc.) in combiner 50 according to various embodiments.

Unlike conventional fixed HUDs, light 46 from display 60 is transmitted through a waveguide rather than entirely through free space in one embodiment. The use of a waveguide and diffraction gratings allows combiner 50 to operate as an extremely compact and lightweight periscope. Such compactness is advantageous in aircraft, especially aircraft with smaller cockpits. In one embodiment, display 60 is fixed with respect to the bore sight angle of an aircraft (e.g., the bore sight angle remains parallel).

Figure 2:
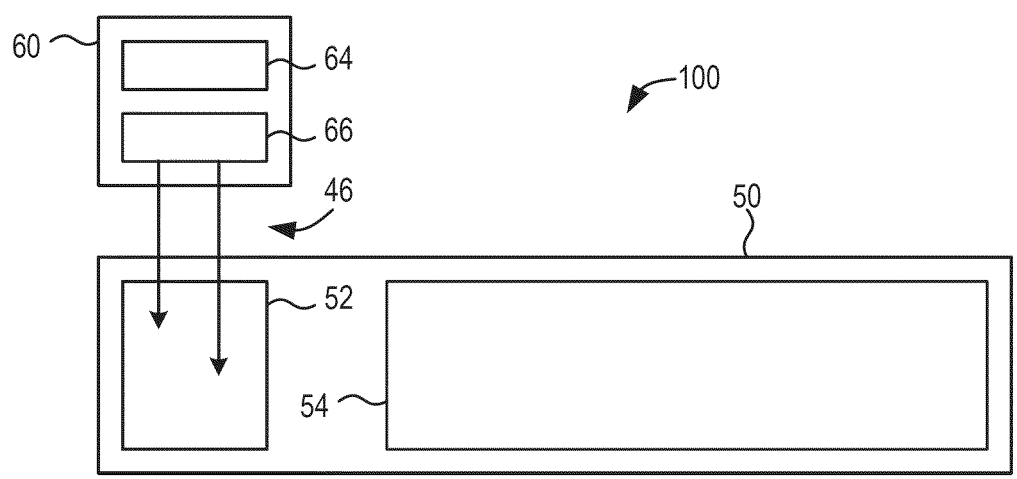
FIG. 2 is a more detailed block diagram of an embodiment of the (HUD) system illustrated in FIG. 1 in accordance with another exemplary embodiment.

With reference to FIG. 2, collimated light display 60 preferably includes a display source 64 and optics 66. Optics 66 can include backlights, light sources, beam splitters, mirrors, prisms, collimating optics, polarizers, lenses (e.g., a field flattener lens, magnifiers, etc.), etc. Display 60 is preferably aligned with the bore sight of the aircraft during installation and fixed to the environment. The term "fixed" as used herein includes systems 10, displays 60, and combiners 50 that are movable for ingress, egress, or breakaway. Preferably, collimated light display 60 is provided as a side-mounted collimator with respect to combiner 50.

Display 64 can be a display or image source of any type including a LCOS display, a LCOS micro-display, an active matrix LCD display, a CRT, an OLED display, or any type of device for providing an image to combiner 50. Display 60 can be a projector used in conventional HUD. In one embodiment, display 60 is a catadioptric collimating source using a LCOS image source.

Advantageously, combiner 50 can eliminate the requirement for expensive combiner stow and breakaway mechanisms due to its light weight in certain embodiments. Further, combiner 50 can also eliminate the need for combiner alignment detection and associated integrity monitoring due to its fixed position according to certain embodiments. In one embodiment, combiner 50 can have a 12×4×0.5 inch configuration, a 6×2×0.25 inch configuration, 8×3×0.125 inch configuration or other configuration. According to one embodiment, system 10 has the advantages of a head worn display without the need for head tracking. Costs associated with system 10 are substantially lower than standard fixed HUDs or even compact HUDs in helmet mounted displays according to certain embodiments. In one embodiment, system weighs 8 pounds or less and has a five millirad accuracy.

Combiner 50 includes diffraction gratings 52 and 54 in one embodiment. Combiner 50 has a rectangular prismatic shape having a width (horizontal) larger than its length (vertical) and a thickness smaller than its length in one embodiment. In one embodiment, combiner is flat and non-flexible, although curved and flexible waveguides can be used. Other shapes for combiner 50 are possible including oval, curved, etc. The waveguide for combiner 50 can be manufactured with relatively low cost material and can be coated or uncoated in one embodiment.

Combiner 50 can include a set of diffraction gratings 52 and 54 configured to diffract light in accordance with a periscopic effect. Gratings 52 and 54 can be any type of diffractive element. In one embodiment, volume gratings including such as switched Bragg gratings or holographic gratings are utilized. In one embodiment, surface gratings having a spatial frequency of 2000 to 4000 lines per millimeter is utilized. Alternatively, reflective layers instead of gratings 52 and 54 disposed to inject and eject light into and out of the waveguide.

Diffraction gratings 52 and 54 can be manufactured according to a variety of techniques. Gratings 52 and 54 can be formed by etching, cutting, printing, wet chemical, dry chemical, ion etching, laser etching, electron beam etching, staining, holographic exposure, etc. The waveguide for gratings 52 and 54 is manufactured from any suitable material including, but not limited to transparent or translucent materials, such as, dielectric materials with high permittivity and high index of refraction (e.g., glass or plastic) according to one embodiment. The waveguide can also be a laminate material and can be shaded or coated for filtering light.

Diffraction gratings 52 and 54 can be provided only on a first-end (input end) and a second end (output or combiner end) of combiner 50 for effecting the periscopic effect in one embodiment. The intermediate portion between the first end and second end is preferably free of diffraction gratings and operates as a waveguide between the input and output.

System criteria and application parameters may affect the size and type of spacing for gratings 52 and 54. The area associated with the input of light 46 is smaller than the area associated with the output of light 42. The difference in area results in an effective horizontal expansion of light 46 incident on combiner 50. The ratio of areas depends upon design criteria and system applications. For example, the use of a smaller display and design criteria of a larger pupil would result in a larger area ratio. In one embodiment, such an expansion can be defined by the need to have an exit pupil large enough to allow a degree of freedom of movement of the pilot's head without loss of display.

Figure 3:
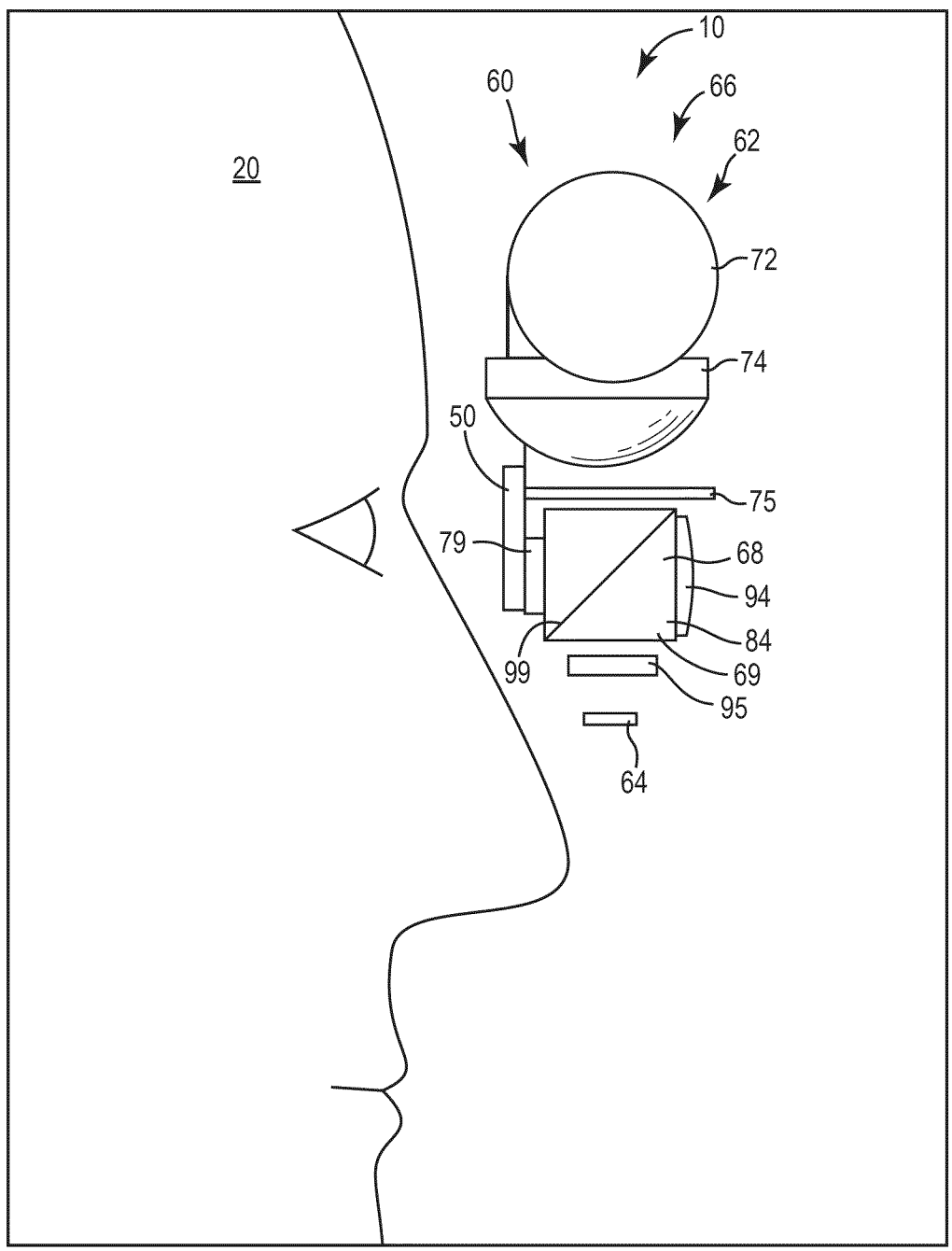
FIG. 3 is a side view schematic drawing of an embodiment of the system illustrated in FIG. 1 being used by an operator in accordance with an exemplary embodiment.
Figure 4:
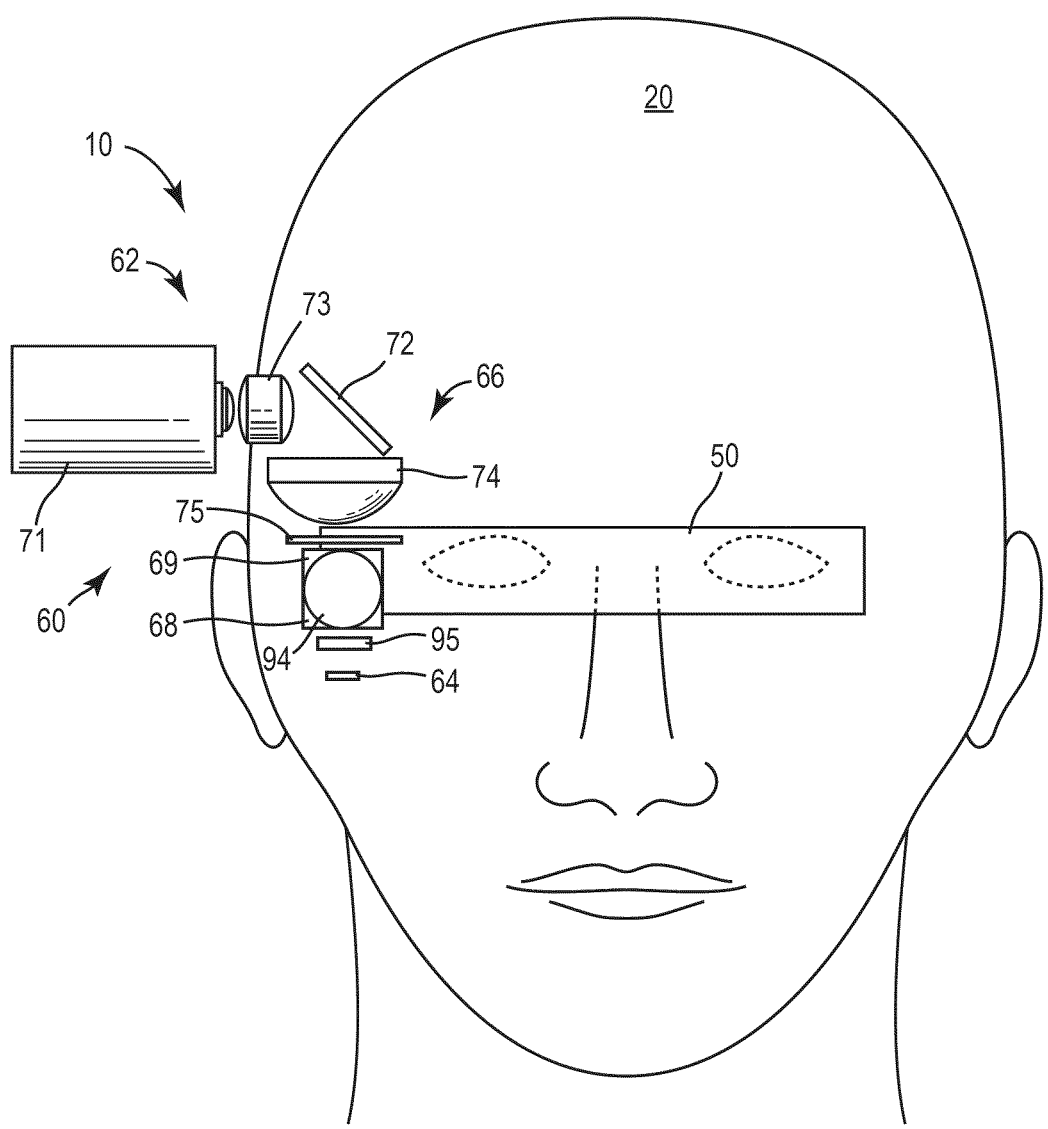
FIG. 4 is a front view schematic drawing of the system illustrated in FIG. 3 in accordance with an exemplary embodiment.
Figure 5:
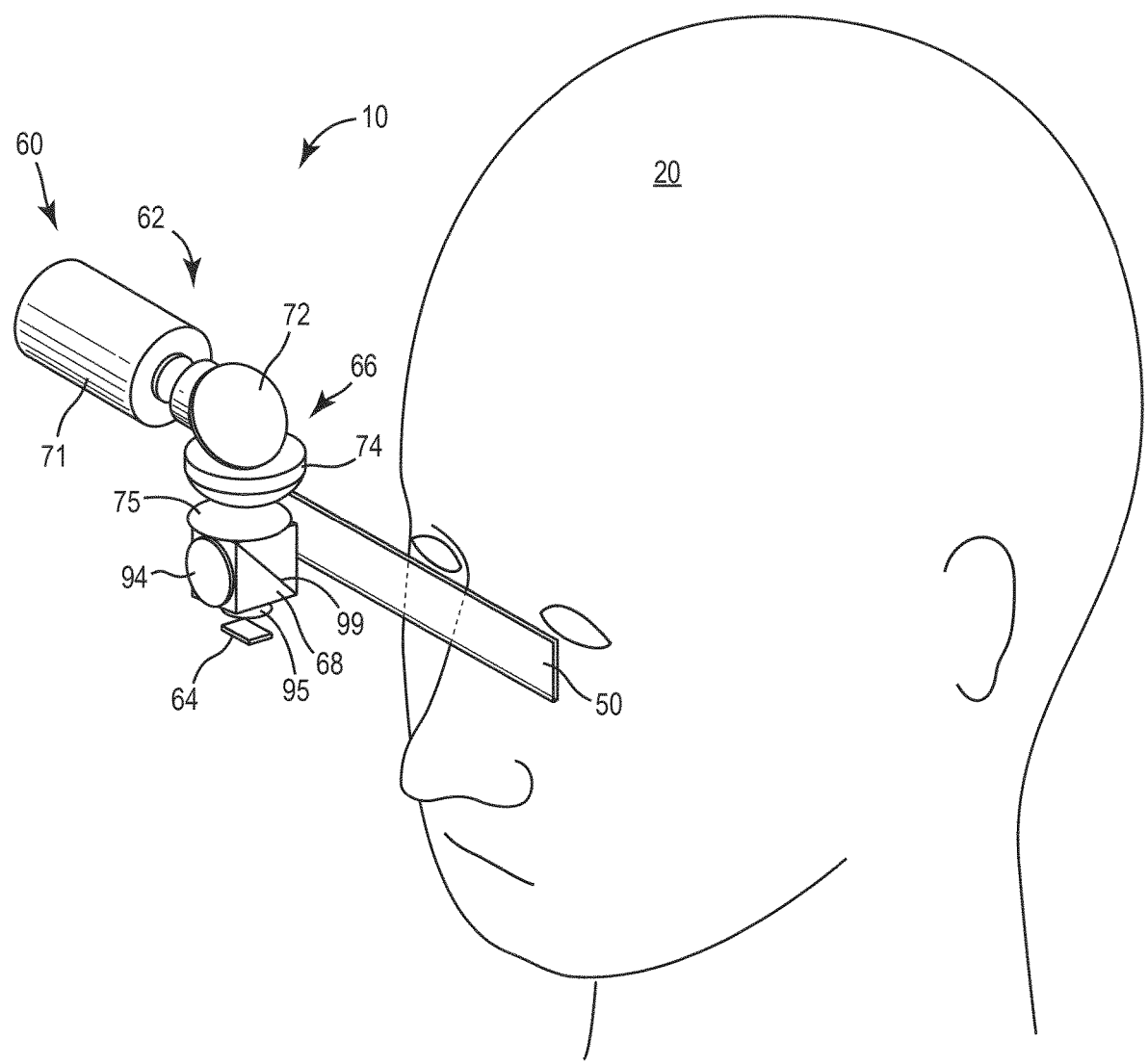
FIG. 5 is a perspective view schematic drawing of the system illustrated in FIG. 3 in accordance with an exemplary embodiment.

With reference to FIGS. 3, 4 and 5, display 60 includes optics 66 comprised of an LED light source and illumination optics 62, a module 68, a corrective lens 79 and a collimating lens 95. Module 68 includes a polarizing beam splitter 69 and a collimating mirror 94 in one embodiment.

LED light source and illumination optics 62 includes an LED light source 71, a bi-convex focusing lens 73, a mirror 72, a planoconvex lens 74 and a polarizer 75. Mirror 72 can also be a folding prism or other optical element.

Image source 64 (e.g., a LCOS display) and lens 95 can be provided beneath module 68 in one embodiment. Module 68 can operate in accordance with catadioptric principles described in U.S. patent application Ser. No. 13/250,621, incorporated herein by reference in its entirety. In one embodiment, source 60 is a smaller version of the collimator described therein. Module 68 provides a compact arrangement for providing collimated light to grating 52 of combiner 50 in one embodiment. Module 68 can be attached to lens 79 which is attached to combiner 50 according to one embodiment.

The assembly of LED light source and illumination optics 62, module 68, image source 64, and lens 95 can be mounted on a bracket fixed to a ceiling or bulkhead wall in a cockpit according to one embodiment. Light from source 71 can be provided through lens 93, off mirror 72, through lens 74 and polarizer 75, polarizing beam splitter 69 of module 68, lens 95 to display 64. Light is reflected from display 94 and reflected by beam splitter interface 99 (FIG. 3) to a collimating mirror 94 which provides light through beam splitter 69 to lens 79 and combiner 50. Beam splitter 69 allows polarized light of one state to travel through beam splitter 69 and changes the polarity of the light to a state that is reflected at interface 99 to mirror 94. Optics 66 including mirror 94, lens 95 and lens 79 cooperate to provide collimated light according to catadioptric principles in one embodiment.

U.S. Pat. No. 8,089,568 issued to Brown et al. and assigned to the assignee in the present application and U.S. Pat. No. 7,733,572 issued to Brown, et al. and assigned to the assignee in the present application describe catadioptric collimation in a fixed HUD and are herein incorporated by reference in their entireties.

The vertical eye box of system 10 can be enlarged using dual axis expansion in a waveguide as explained below according to one embodiment. More expansion can require more power from display 60. System 10 can scale to a full size HUD with advantageously large eye relief in one embodiment.

Figure 6:
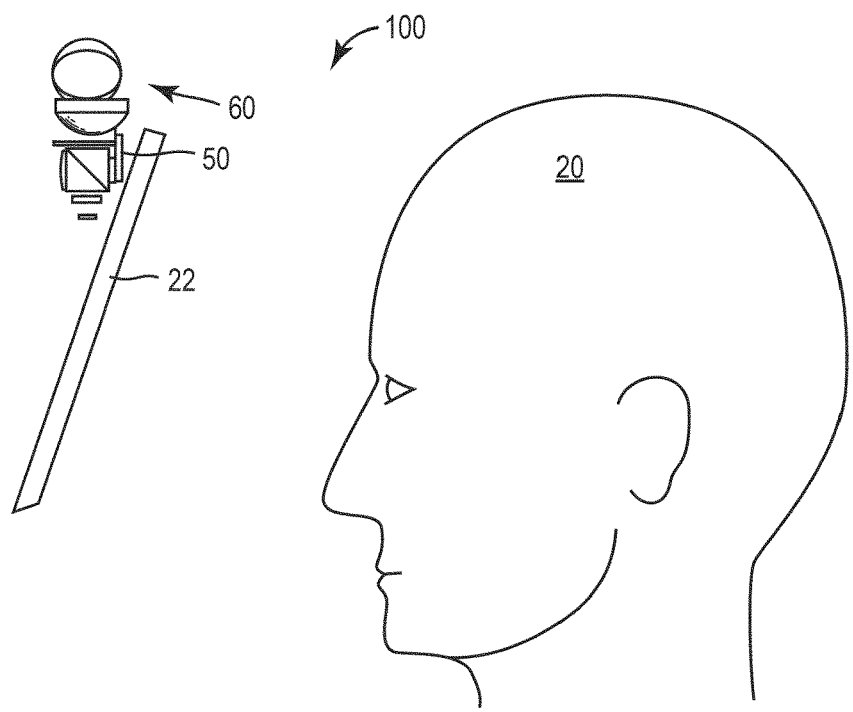
FIG. 6 is a side view schematic drawing of a near eye HUD system including a second combiner for vertical pupil expansion in accordance with an exemplary embodiment.
Figure 7:
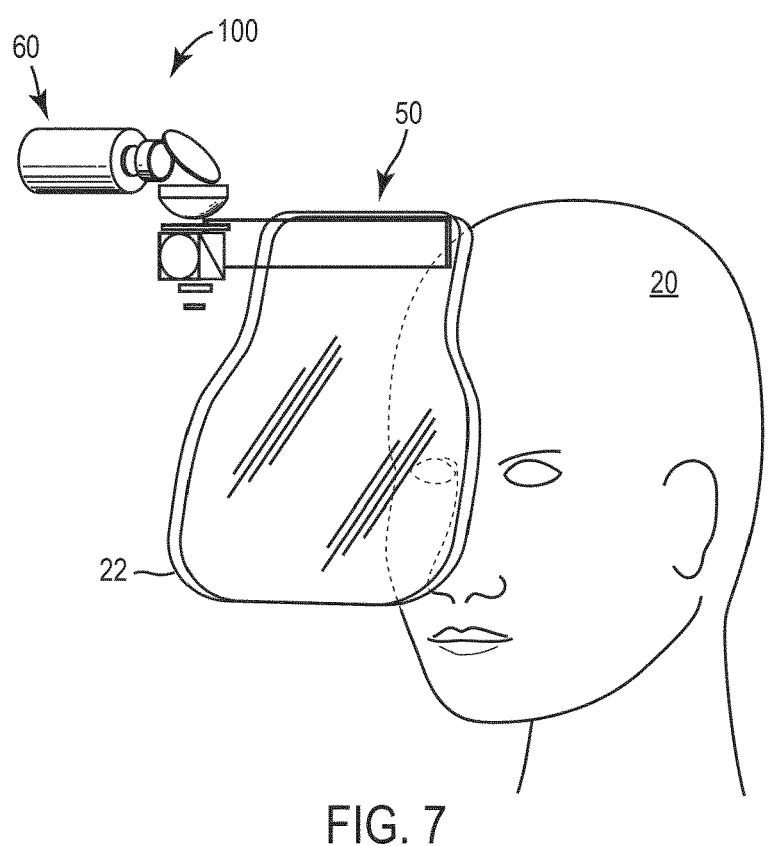
FIG. 7 is a perspective view schematic drawing of the system illustrated in FIG. 6 in accordance with an exemplary embodiment.

With reference to FIGS. 6 and 7, system 100 can provide vertical pupil expansion using a combiner 22. System 100 uses display 60 to provide collimated light through combiner 50 to combiner 22. Combiner 22 can receive light from grating 54 (FIG. 2) in one embodiment. According to one embodiment, combiner 22 can be a combiner such as the combiner described in U.S. patent application Ser. Nos. 13/250,994 and 13/250,940 incorporated herein by reference. The use of vertical pupil expansion allows combiner 22 to be mounted further away from the eyes of user 20. Combiner 22 can use diffraction gratings in a manner similar to combiner 50. In one embodiment of combiner 22, exit gratings can have a larger area than input gratings to effect vertical pupil expansion as described in U.S. patent application Ser. Nos. 13/251,087 and 13/250,994.

Various geometries and placement of the systems 10 and 100 are possible and can be configured for specific cockpit geometries. Systems 10 and 100 can utilize a reflective optics utilized by conventional substrate guided HUD systems in alternative embodiments. Expense can be saved using molded optics and more simplistic coatings in systems 10 and 100 in certain embodiments.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of materials, dimensions, and processes are mentioned, other materials, dimensions, and process steps can be utilized. Various changes may be made to the details disclosed without departing from the spirit of the invention which is defined by the following claims.

What is claimed is:

1. A near eye display comprising:
a projector comprising a polarizing beam splitter coupled with a collimating mirror and configured to provide collimated light, wherein the projector is configured to perform catadioptric collimation and comprises an illuminator and an illuminator mirror on a first side of the polarizing beam splitter and between the illuminator and the polarizing beam splitter to receive illuminator light from the illuminator and reflect the illuminator light to the polarizing beam splitter, wherein an image source is disposed on a second side of the polarizing beam splitter opposite the first side, wherein the collimating mirror is attached to a third side of the polarizing beam splitter, the third side being a side farthest from the user under normal operation, a planoconvex lens is disposed between the illuminator mirror and the first side of the polarizing beam splitter, a convex surface of the planoconvex lens facing the polarizing beam splitter, and a collimating lens is disposed between the image source and the second side of the polarizing beam splitter; and a combiner system configured to be disposed at a near eye location with respect to a user, the combiner system having an input end including a first diffraction grating for receiving the collimated light from the projector, and a combiner end including a second diffraction grating for receiving light from an outside scene and providing the collimated light received at the input end and the light received from the outside scene to the user, and an intermediate portion between the input end and the combiner end free of diffraction gratings, the intermediate portion configured to operate as a waveguide between the input end and the combiner end;

wherein the combiner system is unattached to the user and fixed at a distance within four inches of eyes of the user and is provided in front of both of the eyes of the user when in operation, the projector being disposed at the input end of the combiner system, the input end being horizontally opposite from the combiner end of the combiner system, wherein the projector is attached to the combiner system at a fourth side of the polarizing beam splitter opposite the third side, the combiner system including a first area associated with input of the collimated light at the input end and a second area associated with output of light at the combiner end, the first area being less than the second area such that the combiner system is configured to expand a pupil horizontally as the collimated light travels from the input end to the combiner end, and the combiner system being configured to provide full binocular overlap at the combiner end via the pupil in a lateral eye box associated with the pupil such that information is displayed by the combiner system to both eyes of the user simultaneously, wherein the combiner system utilizes the waveguide and diffraction gratings such that the combiner system operates according to a periscopic effect where input rays of the collimated light at the input end are parallel to output rays of the light provided to the user.

2. The display of claim 1, wherein the diffraction gratings are surface gratings or volumetric holograms.

3. The display of claim 2, wherein the diffraction gratings are holograms.

4. The display of claim 3, wherein the waveguide is a glass material.

5. The display of claim 4, wherein the waveguide has a rectangular shape extending laterally to be positioned in front of the eyes of the user and extending vertically in a dimension smaller than a lateral dimension of the waveguide.

6. The display of claim 1, wherein the image source is a LCOS display.

7. The display of claim 6, wherein optics for catadioptric collimation are provided with the LCOS display.

8. The display of claim 1, wherein the projector is configured such that the illuminator light enters the polarizing beam splitter via the first side, travels through second side of the polarizing beam splitter to the image source, is reflected by the image source towards an interface of the polarizing beam splitter, is reflected by the interface of the polarizing beam splitter towards the collimating mirror through the third side of the polarizing beam splitter, and is provided by the collimating mirror through the polarizing beam splitter to the combiner system to provide the collimated light.

9. A mounted device comprising:
a projector configured to provide a near collimated or collimated image, the projector comprising a polarizing beam splitter coupled with a collimating mirror and configured to provide collimated light, wherein the projector is configured to perform catadioptric collimation and comprises an illuminator and an illuminator mirror on a first side of the polarizing beam splitter and between the illuminator and the polarizing beam splitter to receive illuminator light from the illuminator and reflect the illuminator light to the polarizing beam splitter, wherein an image source is disposed on a second side of the polarizing beam splitter opposite the first side, wherein the collimating mirror is attached to a third side of the polarizing beam splitter, the third side being a side farthest from the user under normal operation, a planoconvex lens is disposed between the illuminator mirror and the first side of the polarizing beam splitter, a convex surface of the planoconvex lens facing the polarizing beam splitter, and a collimating lens is disposed between the image source and the second side of the polarizing beam splitter; and
a combiner comprising a first diffraction grating member wherein the first diffraction grating member has a length of four inches or more, a width of 2 inches or less and a thickness of 0.5 inches or less and configured so that a first end of the first diffraction grating member can be provided in front of eyes of a user and a second end of the first diffraction grating member receives the collimated or near collimated image, wherein the projector is attached to the combiner at a fourth side of the polarizing beam splitter opposite the third side,
wherein the first end receives light from a real world scene, the first end is associated with a first area for outputting light to the eyes of the user, and the second end is associated with a second area for receiving the collimated or near collimated image, the second area being less than the first area such that the first diffraction grating member provides horizontal pupil expansion,
wherein the first end is horizontally opposite to the second end and the real world scene is viewed at a location of the horizontal pupil expansion, wherein full binocular overlap is provided in a lateral eye box associated with the horizontal pupil expansion such that information is provided to both eyes of the user simultaneously, wherein the combiner operates according to a periscopic effect where input rays of the collimated light are parallel to output rays of the light outputted to the eyes of the user.

10. The mounted device of claim 9, wherein the projector comprising a Liquid Crystal On Silicon (LCOS) source using high magnification provides the collimated or near collimated image.

11. The mounted device of claim 10, wherein an assembly including the LCOS source is attached to the second end of the first diffraction grating member.

12. The mounted device of claim 11, wherein the second end extends away from a head of the user when the user looks through the first end.

13. A method of providing guidance information to a pilot's eyes in an aircraft, the method comprising:
providing collimated or near collimated light indicative of the guidance information from a display to a first end of a passive element disposed within three inches of the pilot's eyes using a polarizing beam splitter coupled with a collimating mirror, wherein the display is configured to perform catadioptric collimation and comprises an illuminator and an illuminator mirror on a first side of the polarizing beam splitter and between the illuminator and the polarizing beam splitter to receive illuminator light from the illuminator and reflect the illuminator light to the polarizing beam splitter, wherein an image source is disposed on a second side of the polarizing beam splitter opposite the first side, wherein the collimating mirror is attached to a third side of the polarizing beam splitter, the third side being a side farthest from the user under normal operation, the passive element being a combiner fixed relative to the pilot's eyes, a fourth side of the display opposite the third side being fixed to the combiner during normal operation, a planoconvex lens is disposed between the illuminator mirror and the first side of the polarizing beam splitter, a convex surface of the planoconvex lens facing the polarizing beam splitter, and a collimating lens is disposed between the image source and the second side of the polarizing beam splitter; and
combining light from a real world scene with the collimated or near collimated light using the passive element to output the combined light at a second end of the passive element, wherein the first end is associated with a first area that is less than a second area associated with the second end such that the passive element is configured to provide horizontal pupil expansion to the collimated or near collimated light and the real world scene is viewed at a location of the horizontal pupil expansion, wherein full binocular overlap is provided in a lateral eye box associated with the horizontal pupil expansion such that information is displayed to both of the pilot's eyes simultaneously, wherein the passive element causes a periscopic effect where input rays of the collimated or near collimate light are parallel to output rays at the location of the horizontal pupil expansion.

14. The method of claim 13, wherein the display is a highly magnified liquid crystal on silicon (LCOS) display.

15. The method of claim 13, wherein the passive element is a waveguide substrate.

16. The method of claim 13, wherein the illuminator and the collimating mirror are in a package.

* * * * *